United States Patent
Lu et al.

(10) Patent No.: US 8,286,253 B1
(45) Date of Patent: Oct. 9, 2012

(54) DATA LEAKAGE PREVENTION FOR RESOURCE LIMITED DEVICE

(75) Inventors: Minggang Lu, Nanjing (CN); Pei Chang, Nanjing (CN); Jing Li, Nanjing (CN); Tian Fan, Nanjing (CN); Wen Zhu, Nanjing (CN)

(73) Assignee: Trend Micro Incorporated, Tokyo (JP)

( * ) Notice: Subject to any disclaimer, the term of this patent is extended or adjusted under 35 U.S.C. 154(b) by 472 days.

(21) Appl. No.: 12/623,934

(22) Filed: Nov. 23, 2009

(51) Int. Cl.
*G06F 17/30* (2006.01)
(52) U.S. Cl. .................. 726/26; 726/27; 726/29
(58) Field of Classification Search .......... None
See application file for complete search history.

(56) References Cited

U.S. PATENT DOCUMENTS

2011/0296308 A1* 12/2011 Yi .................. 726/27
2012/0042385 A1* 2/2012 Risan .............. 726/26
2012/0066762 A1* 3/2012 Todorovic ........ 726/22

* cited by examiner

*Primary Examiner* — David Y Jung
(74) *Attorney, Agent, or Firm* — Beyer Law Group LLP

(57) ABSTRACT

When a resource-limited device (such as a mobile telephone) joins a network associated with an enterprise, the agent in the device generates digital signatures for all the files in the device and sends them to an enterprise controller. The controller compares them to the global signature database; it filters out the sensitive digital signatures and feeds them back to the agent in the device. The agent receives the feedback of digital signatures and consolidates them into its own local signature database. The agent analyzes each file that is attempting to be output from the device according to the local signature database and DLP policy. If the signature of the file is present in the local database then the action to output file is blocked. If a new file is created on the device, the agent generates and sends its digital signature to the controller for inspection. If the signature is sensitive, this new digital signature will be placed into the local signature database. If the DLP controller updates the global signature database, the device will send its signatures once again for comparison.

20 Claims, 4 Drawing Sheets

DATA LEAKAGE PREVENTION FOR RESOURCE LIMITED DEVICE

FIELD OF THE INVENTION

The present invention relates generally to data leakage prevention for computing devices. More specifically, the present invention relates to leakage prevention for resource-limited devices using a local signature.

BACKGROUND OF THE INVENTION

Information within organizations and entities is often classified as sensitive either for business reasons or for legal reasons. This information may reside within text files, databases, images, pictures, messages, etc. In addition to the potential threat of an unscrupulous party illegally accessing the organization from the outside via an electronic network, and then removing or disrupting the information, there exists the risk of intentional or inadvertent transmission of the sensitive information from inside the organization to the outside. For example, a disgruntled employee might send a sensitive data file to which he or she has access to an outside party via e-mail, thus causing harm to the organization.

In addition to simple business reasons for not wanting sensitive information to be released, i.e., the desire to keep trade secrets secret, many new government regulations mandate controls over information (requiring the sensitive information not to be released outside the company) and companies must comply in view of significant penalties. For example, HIPAA regulates health information, BASEL II regulates financial information, Sarbanes-Oxley regulates corporate governance, and a large number of states have passed data privacy laws requiring organizations to notify consumers if their information is released. Companies are even subject to a regular information technology audit which they can fail if they do not employ suitable controls and standards. Companies today are struggling to determine where their most sensitive information is stored, how it is being used, who has access to it and how to prevent it from being lost or compromised.

Technology companies have reacted to this environment with a host of data leakage prevention (DLP) products. These products are typically hardware/software platforms that monitor and prevent sensitive information from being leaked outside the company, and automatically enforce data protection policies. These DLP products are also known as data loss prevention, information leak prevention, etc. Gateway-based DLP products are typically installed at the company's Internet network connection and analyze outgoing network traffic for unauthorized transmission of sensitive information. These products typically generate a unique signature of the sensitive information when stored within the company, and then look for these signatures as information passes out over the network boundary, searching for the signatures of the sensitive information. Host-based DLP products typically run on end-user workstations within the organization. These products can address internal as well as external release of information and can also control information flow between groups of users within an organization. These products can also monitor electronic mail and instant messaging communications and block them before they are sent.

The traditional way to implement data leakage prevention is to define a global data signature database in a software product such as a "Data Leakage Prevention Enforcer" which is a control center that defines prevention policies, audits data leakage, and analyzes results. The signature of each data item is typically computed by an algorithm using the data item. Each signature typically occupies about 64 bytes on disk. Considering an organization that might need to protect one million files, the DLP global signature database would occupy about 64 Mbytes on disk. This storage required for the global database could scale to an even greater number with any enlargement of the scope of leakage prevention required. For desktop computers and laptop computers this storage requirement is acceptable since they typically have enough capacity and processing capability to bear the load.

But, mobile computing devices (such as mobile telephones, notebook computers, personal digital assistants, etc.) often have very limited resources (i.e., their memory capacity is often less than 1 MByte) and the capacity of their file systems is also limited. In addition, some mobile devices do not support floating point computation, and their processing speed can be more than 1,000 times slower compared with an ordinary desktop computer. It can be almost an impossible task to load the traditional global DLP signature database into these resource-limited devices, let alone execute the DLP product successfully upon the device. As more and more mobile devices connect to enterprise networks and are allowed access to sensitive files, it will be important to prevent data leakage from these devices.

Therefore, it would be desirable to have an improved apparatus and technique for preventing data leakage from resource-limited computing devices such as mobile telephones, etc.

SUMMARY OF THE INVENTION

To achieve the foregoing, and in accordance with the purpose of the present invention, a novel technique is disclosed that provides an effective and efficient way to enforce data leakage protection in resource-limited devices (e.g., mobile telephones, netbooks, and PDAs).

The present invention aims to provide data leakage prevention for mobile devices using a "local signature" which can easily execute in mobile devices with a minimum of memory and CPU speed, yet can still obtain optimal prevention results. Compared with the prior art approach of pushing a global signature database to every device in the organization (including resource-limited mobile devices), it is more feasible to execute the present invention on mobile devices. Because mobile devices typically have fewer files, fewer local signatures need to be stored. In one embodiment, it may not be necessary to recalculate the signature for a file that is being moved from the mobile device; not having to recalculate a signature lessens the burden on the device's CPU and its memory.

In one embodiment, a mobile computing device calculates digital signatures for its files and sends these signatures to a computer of the enterprise. A controller at the enterprise computer compares these signatures with a global signature database to determine which files present on the mobile computing device are sensitive files that should be subject to the DLP policy. Those signatures that match are returned to the mobile device (or a unique identifier is returned). Once returned, the signatures are put into a local signature database for use with the DLP policy on the mobile device.

In a second embodiment, a mobile device uses its DLP policy and its local signature database to prevent sensitive files from being transferred from the device. Once a triggering event occurs on the mobile device, the device determines if the event is covered by the policy, and if so, whether or not the digital signature of the associated file is present within the local signature database. If so, then the desired activity associated with the triggering event is blocked from occurring.

In a third embodiment, a DLP controller on an enterprise computer filters signatures received from a mobile computing device. The enterprise computer includes a global signature database of sensitive files present within the enterprise. Once a mobile device connects to the enterprise network, the mobile device sends digital signatures from all of its files. The DLP controller then filters these digital signatures against the global database to determine only those digital signatures from the mobile device that represent sensitive files within the enterprise. These digital signatures (or an identifier thereof) are returned to the mobile device so the mobile device has a local signature database representative of its sensitive files.

In a fourth embodiment, synchronization between the global database and the local database occurs when the global database is updated. When this occurs, the mobile device resends all of its digital signatures to the enterprise computer for an updated comparison with the updated global signature database.

In a fifth embodiment, a new file present on the mobile device triggers a further check against the global signature database. When a new file is created on the mobile device, the mobile device agent calculates its signature, sends the new signature to the DLP controller, and receives the signature back if it is deemed sensitive.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

As mentioned above, the traditional data leakage prevention (DLP) approach works fine with desktop or laptop computers which have large memories and powerful processing capabilities. Unfortunately, it is difficult for mobile devices to carry out the computation intensive tasks required of DLP products due to their inherent limited memory and limited processing power. Using the traditional DLP approach with mobile devices would not be appropriate.

It is realized that, compared with a desktop computer, the number of files stored in a resource-limited device (e.g., a mobile telephone) is very small. Keeping this in mind, it will be useful to decrease the DLP signature database in a mobile device. The present invention thus utilizes a DLP software agent in the mobile device and a DLP software controller located at a fixed device, such as a desktop computer or computer server.

The role of the DLP agent is to perform the following functions: automatically generate digital signatures for the files in the mobile device; send the signatures to the DLP controller; retrieve signature judging results from the DLP controller and store local signatures; synchronize with the DLP controller on DLP policy; audit and control local file operations according to the DLP policy and signatures from DLP controller; and once a new file is created in the mobile device, generate a digital signature and send it to the DLP controller.

Likewise, the DLP controller performs the following functions: crawl its network to generate global signatures for its organization; and compare and judge whether the digital signatures received from the resource-limited device are sensitive or not, and send back the results.

One possible work flow is as follows. When a resource-limited device joins a network associated with the DLP controller, the agent in the device generates digital signatures for all the files in the device and sends them to the DLP controller. The DLP controller then inspects the digital signatures and compares them to the global signature database; it filters out the sensitive digital signatures and feeds them back to the agent in the device. The agent receives the feedback of digital signatures and consolidates them into its own local signature database. The agent may then analyze each file that is attempting to be output from the device according to the local signature database and DLP policy. If a new file is created on the device, the agent generates and sends its digital signature to the DLP controller for inspection. If the signature is sensitive, this new digital signature will be placed into the local signature database. If the DLP controller updates the global signature, the device will send its signatures once again for comparison.

Block Diagram

As mentioned above, the data leakage prevention technique of the present invention prevents files and other digital objects from being transmitted or leaked from mobile computing devices that are part of an enterprise.

Figure 1:
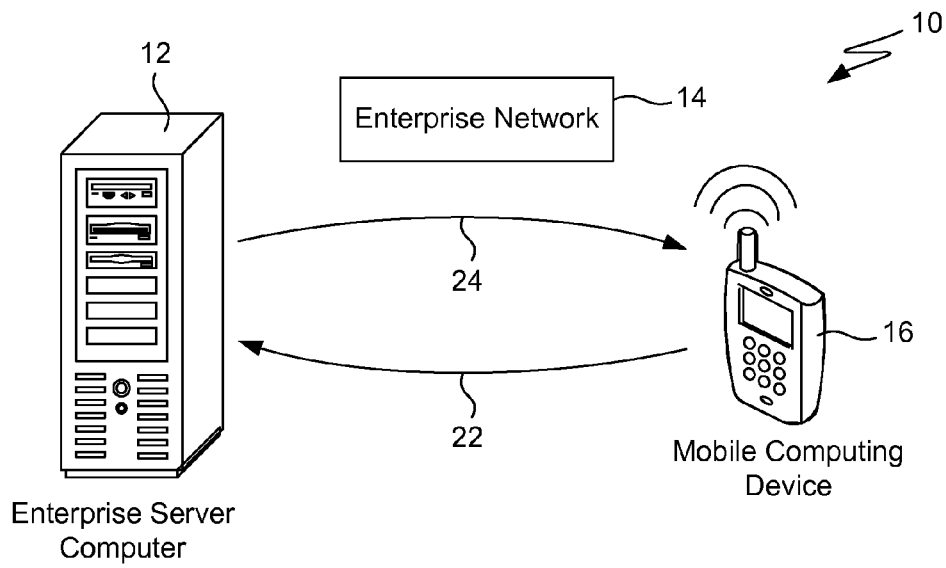
FIG. 1 illustrates an environment in which a mobile device is under control of an enterprise.

FIG. 1 illustrates an environment 10 in which a mobile device is under control of an enterprise. Shown is a server computer 12 of the enterprise, a mobile computing device 16 and communication links 22 and 24 between these hardware devices. Computer 12 is any suitable laptop, desktop or more powerful server computer that traditionally implements a DLP software product that serves the entire enterprise. Of course, this computer communicates over an enterprise network 14 with the rest of the enterprise and may be in communication with any number of other server computers, end-user computers and other software products. As is known in the art, this server computer and the many end-user computers are all under control of the enterprise and subject to its DLP policy.

Also shown is a mobile computing device 16 such as a mobile telephone, smart phone, personal digital assistant, handheld navigation unit, portable music player, netbook computer, set-top box, multi-media player, etc. In general, mobile device 16 is characterized in that it does not have the memory needed to store an entire global signature database of a DLP product, nor the processing power needed to manage such a product and database. In the context of the invention, device 16 and its user are subject to a DLP policy promulgated by the enterprise meaning that the device will implement this policy and may be required to block certain actions that the user attempts in order to prevent sensitive data from being leaked from the enterprise.

In the course of operation, server computer 12 sends information and data over a link 24 to the computing device and the computing device sends information and data back to the computer over link 22. Communication may occur directly with the server computer or via the enterprise network. Typically, these links are a single communication channel that may be wired or wireless. In a wireless environment, this communication channel may be a standard wireless telephone connection (e.g., cell phone service), a Wi-Fi connection, a Wi-Max connection, a wireless Internet connection, a Bluetooth protocol connection, an infrared connection, or any other suitable radio frequency connection used by the mobile device.

In a wired environment, the mobile device may be connected to the server computer (or to another proxy computer downstream of the server computer, or to enterprise network 14) via an Ethernet cable (in the case of a netbook computer), via a docking device wired to the server computer (in the case of a mobile telephone), or via any other suitable wired connection protocol such as USB, etc.

Figure 2:
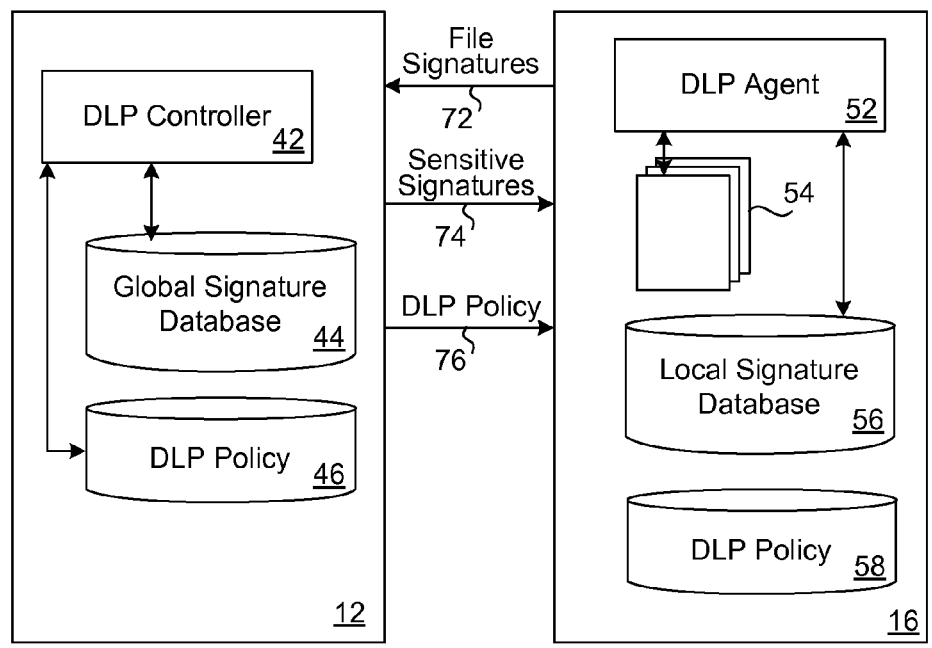
FIG. 2 illustrates another view of environment showing details of the server computer and the mobile device.

FIG. 2 illustrates another view of environment 10 showing details of the server computer and the mobile device. Server computer 12 includes (among other hardware and software) a DLP controller 42 whose functions are detailed below. Controller 42 may be written using any language, e.g., C, C++, assembly, etc.

This controller may be embedded within a complete DLP product installed upon the enterprise server computer, or may be a module separate from the DLP product, where the actual DLP product is installed elsewhere. Also included, and in communication with controller, is a database of DLP policy 46 that dictates how sensitive digital files and objects located on mobile devices (or other enterprise devices) should be managed. In one embodiment, a sensitive file subject to the policy is defined as any file whose signature is present in the local database. This policy dictates in what circumstances a sensitive file on the mobile device (or other enterprise device) should be allowed to be copied, transmitted, output, printed, sent, or otherwise taken outside of control of the enterprise. For example, a DLP policy may include restrictions on files such as: the file may not be copied, transferred, displayed, printed, transferred to removable storage of the mobile device (such as a memory card or USB key), sent as an attachment, uploaded, etc. Of course, a policy may include a single one of these restrictions, other restrictions, or any combination of these restrictions. The local policy 58 may be stored within any suitable database or memory of the device and may be implemented in suitable software, such as a rules database. Other examples of restrictions in a policy are: any GSM message including the sensitive information is forbidden to be sent, the e-mail message including sensitive information is not permitted to be sent to unauthorized users, the sensitive files are banned from being transferred to another mobile device using infrared transmission or Bluetooth, etc.

Global signature database 44 is a database containing digital signatures for files that the enterprise has deemed as being sensitive. An organization may deem any digital file sensitive because it does not wish the file to be transmitted outside the organization, does not want the file to be transmitted outside a particular group of users, does not wish the file to be moved from a storage location, does not wish the file to be moved from a mobile computing device controlled by the organization, etc. A file may be marked as sensitive by computing a unique digital signature for the file (such as a hash function, message digest, etc.) and then storing that unique digital signature in database 44 accessible by controller 42. As known in the art, a DLP product has the capability to input a list of sensitive files, calculate their digital signatures, and store the signatures within the product itself if the database is internal. Database 44 may be implemented using software such as MySQL, MS SQL Server, Oracle Database, or any other proprietary custom-built index system.

Turning now to a detailed view of mobile computing device 16, included is a DLP agent 52 having the functionality described above and in more detail below. Agent 52 is preferably written using the C or C++ computer language. Also included within the mobile device are any number of digital files 54. These files include traditional computer text and executable files, digital objects, databases, image files, video files, etc. In general, any digital information stored upon the mobile device may be subject to the DLP policy. A local signature database 56 is created and stored by the DLP agent on the mobile device and may also be implemented using SQLite software or other custom-built index system software. DLP policy 58 is the same as DLP policy 46 stored on the server computer 12, or may be a subset of that policy specifically tailored to mobile devices.

As shown, the DLP agent is arranged to transfer file signatures 72 to the server computer and to receive a list of sensitive signatures 74 in return as will be described in greater detail below.

Flow Diagrams

Figure 3:
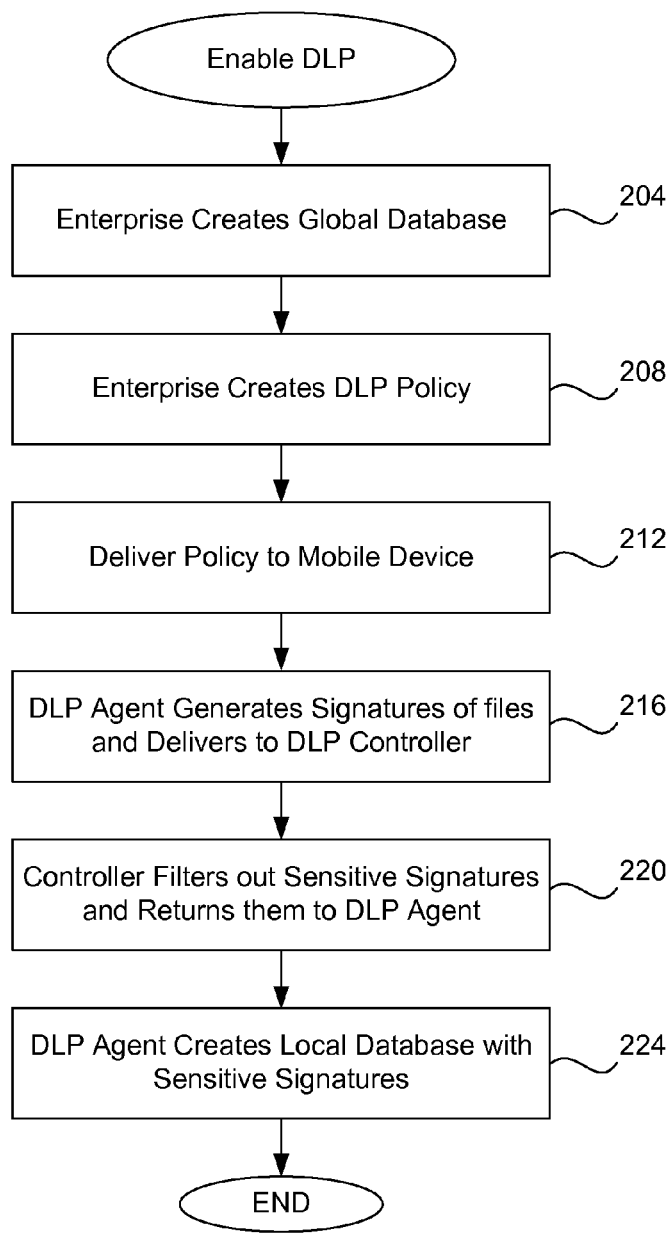
FIG. 3 is a flow diagram describing how the data leakage prevention technique of the present invention is enabled.

FIG. 3 is a flow diagram describing how the data leakage prevention technique of the present invention is enabled. This diagram describes how a local signature database is established within the mobile device in order to prevent data leakage.

In step 204 the unique signatures of sensitive files stored within a computer network of the enterprise are calculated and stored in global signature database 44. These signatures may be calculated using any suitable algorithm, and may be calculated by any suitable software product. For example, the DLP server software may use a hash function to calculate a hash value (such as the MD5) for each sensitive file. Preferably, the signature for each sensitive file is calculated using an algorithm that provides a unique value for each file. The invention may use any suitable signature calculation method, e.g., U.S. Pat. No. 7,516,130 "Matching Engine with Signature Generation" presents one technique, and is hereby incorporated by reference. The enterprise preferably identifies a priori which files are sensitive and should be flagged in the database.

In step 208 a suitable policy 46 (such as the examples given above) is created by the enterprise and stored in database 46. At a suitable time, in step 212 this policy is delivered to each mobile device that is connected to the enterprise network. For example, each time the mobile device joins the network the mobile device retrieves the current policy from enterprise. Or, the enterprise periodically pushes the policy 46 to all mobile devices currently connected to the network.

In step 216 the DLP agent of the mobile device generates signatures for all digital files on the mobile device and delivers them back to the controller 42 of the enterprise. The agent uses the same algorithm used by the controller when generating the global signature database for generating the signatures of the files on the mobile device. Preferably, the agent iterates through all files present on the mobile device such as text files, e-mail messages, text messages, computer files, spreadsheets, image files, video files, documents, etc. This generation of signatures may occur at various times. For example, when the agent is first installed upon the mobile device these signatures are calculated. Or, these signatures may be calculated when the mobile device first joins the enterprise network, at scheduled times as per the enterprise, or whenever a new file is created upon the device.

Optionally, and in addition to the signature for each file, a unique serial number or other identifier may be assigned to each signature. The purpose of the serial number is to allow the controller to identify sensitive signatures by using the shorter serial number rather than needing to send the more lengthy signature back to the mobile device. For example, a serial number may only need one or two bytes in order to uniquely identify files on a mobile device, whereas a signature may take up 64 bytes or more. Once these signatures (and optionally serial numbers) are calculated, they then sent over link 22 back to the server computer 12 for a determination as to whether they are sensitive files. Because not all of the files on the mobile device may be sensitive files, it is desirable to have these signatures filtered by the controller in order to determine which signatures should be present within local database 56.

Next, in step 220 the controller filters out the sensitive signatures from all of the received signatures from the mobile device. The controller may do this by simply comparing the received signatures with those in the global signature database; those that match are deemed sensitive signatures while those that do not match are discarded. The sensitive signatures may be identified for the mobile device by simply returning these filtered sensitive signatures back to the mobile device that had sent them. In this fashion, the mobile device is apprised of which signatures are sensitive and therefore subject to the policy. Alternatively, if a serial number has been included with each signature, only those serial numbers of the determined sensitive files are returned to the agent on the mobile device. Because the agent has previously created the signatures and their corresponding serial numbers, it is apprised of which signatures are sensitive.

In step 224 the agent 52 creates the local signature database 56 using the received sensitive signatures from the controller 42. For example, the agent takes the returned sensitive signatures from the controller and stores the signatures in the local database 56. Or, if the controller had returned only the serial numbers, the agent matches up the returned serial numbers with their corresponding signatures existing on the mobile device and only stores those corresponding signatures into the local database. In addition to the actual signature, the agents may optionally also store within the database the corresponding file name and timestamp of each file. For example, each record in the local database would contain the name of the file, a timestamp of creation, and its unique signature. Because the mobile device typically will contain fewer digital files than are present within the entire enterprise (and fewer digital files than a given end-user computer), the local signature database will be smaller than the global signature database and can be accommodated by the mobile device. At this point, agent 52 is able to prevent data leakage from a mobile device using policy 58 and local database 56.

Figure 4:
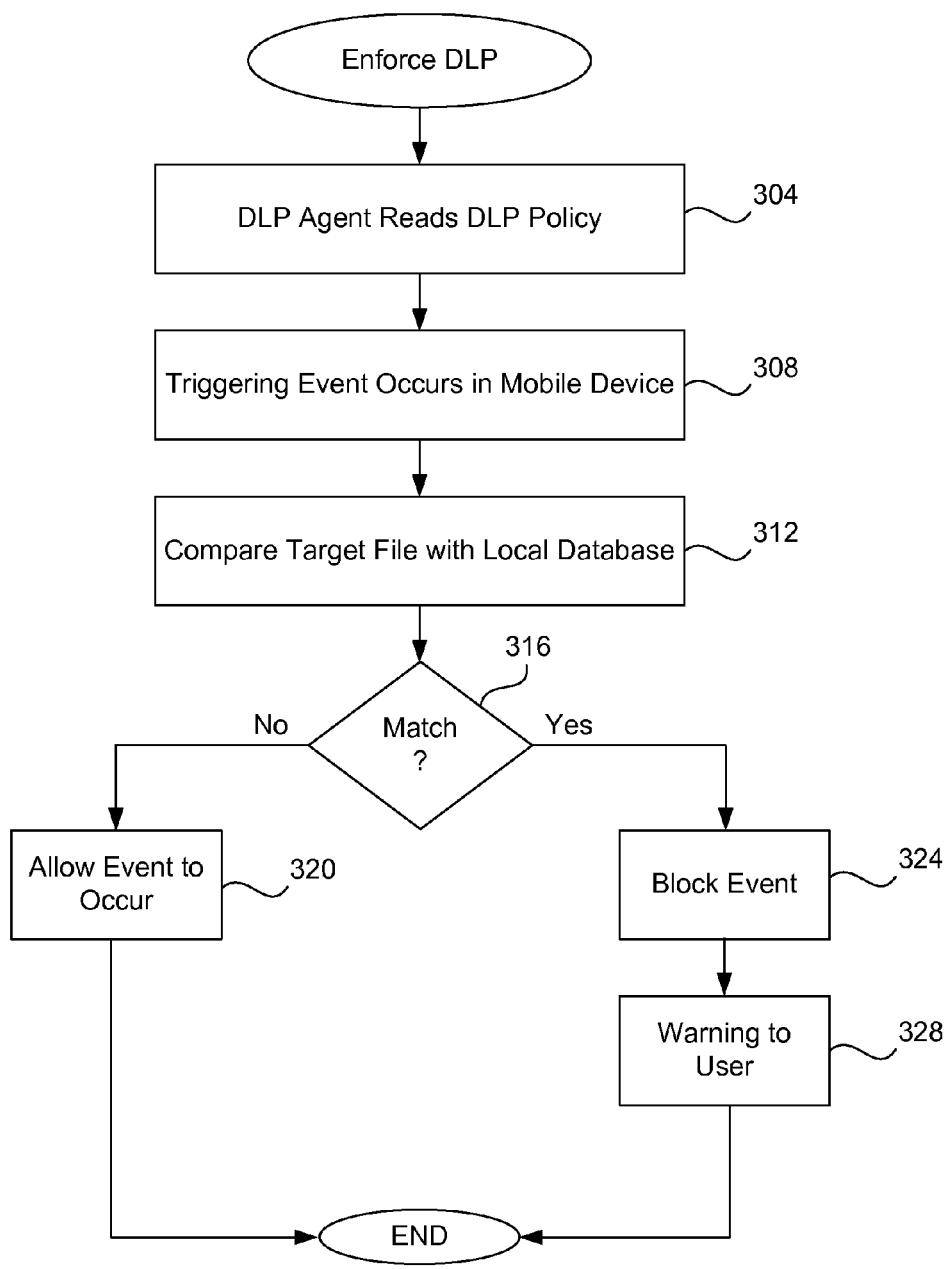
FIG. 4 is a flow diagram describing how a policy is enforced upon a mobile device.

FIG. 4 is a flow diagram describing how a policy is enforced upon a mobile device. At step 304 the DLP agent may read the current policy 58 into a memory of the mobile device in order to prepare for screening of files that are attempted to be output from the device.

In step 308 a triggering event occurs signaling that a user is attempting to output a file from the mobile device. For example, the user may be attempting to attach a file to an e-mail message, upload a file over an Internet connection, copy a file, rename a file, transfer a file to a removable storage device, etc. Accordingly, in step 308 when the user attempts to transfer the file outside of the mobile device, the DLP agent 52 first determines whether or not this activity is proscribed by the current policy, and if so, determines if the file is sensitive and should be allowed to be transferred. In one embodiment, the DLP agent uses a software hooking mechanism to determine when the operating system of the mobile device is attempting to transfer a file such as by copying, uploading, sending, etc. Other triggering events may occur as well. For example, if the user deletes a file within the mobile device, then that corresponding signature and record may be removed from the local database.

Once the agent has identified a file that is about to be transferred from the mobile device, and if the policy is implicated, the agent may employ different techniques in order to determine if the file is a sensitive file. In one embodiment, the agent calculates the signature of this file (using the same algorithm originally used to calculate the signature), and compares this newly calculated signature against the local signature database 56. If there is a match, then the file is sensitive and the operation desired by the user is blocked in step 324. If no match, then the desired action is allowed to occur. Because the number of signatures within the local database is far fewer than in the global database, it is less resource intensive to perform this comparison.

In another embodiment, it is not necessary for the agent to recalculate the digital signature of the suspect file. The agent first determines if the local signature database is up to date. For example, if the timestamp of the suspect file is earlier than the time of the most recent updating of the local signature database, then it is determined that the local database is up to date. Or, if the agent determines that it has used the most recent version of the global database that it is also determined that the local databases up-to-date. If the local database is up-to-date, then the agent simply determines if the file name and timestamp of the suspect file are present within local signature database 56. Because it is extremely unlikely that the local database will contain two entries having the same file name and exact timestamp, this simplified checking will be accurate. If the file name and timestamp of the suspect file are not present within local database 56 then there is no match and the event is allowed to occur. But, if the file name and timestamp are present in the local database then the action desired by the user is blocked in step 324. Again, because there are fewer entries in the local database, this comparison uses fewer resources of the mobile device.

When the desired action is blocked from occurring in step 324 the agent may utilize numerous techniques to perform the blocking. For example, the file may not be allowed to be uploaded, copied, transferred, renamed etc. In addition, in step number 328 a warning may be displayed to the user indicating that the desired operation on the sensitive file has been blocked. Further, a violation notice is sent back from the mobile device to the controller 42 that includes the destination to where the user was attempting to transfer the sensitive file (i.e., web site or IP address, name of removable media, destination e-mail address, location outside enterprise, etc.)

In other situations, it may also be necessary to synchronize the local signature database with the global signature database. The global database includes version information that may be checked by the mobile device each time the device connects or periodically. If the global database has been updated (with new signatures, fewer signatures, or both) then a new version will indicate to the mobile device that it must synchronize its local database. Accordingly, when DLP controller 42 updates global signature database 44, steps 216-224 are performed again. These steps are performed again so that all files present upon the mobile device may be checked again against the global database.

Additionally, when a new file is created on the mobile device, then DLP agent 52 calculates its signature, sends the new signature to the DLP controller, and receives the signature back if it is deemed sensitive (or its serial number). In this fashion, a new file appearing upon a mobile device is checked against the global database to determine whether this file is sensitive and should be screened against the policy when the file is attempted to be output from the device. Similarly, if a new file simply appears upon the mobile device or if the file is changed, then the signature of this new or changed file is also sent back to the controller for judgment. If a file is deleted from the mobile device then the agent will simply remove its signature or data record from the local database.

Computer System Embodiment

Figure 5A:
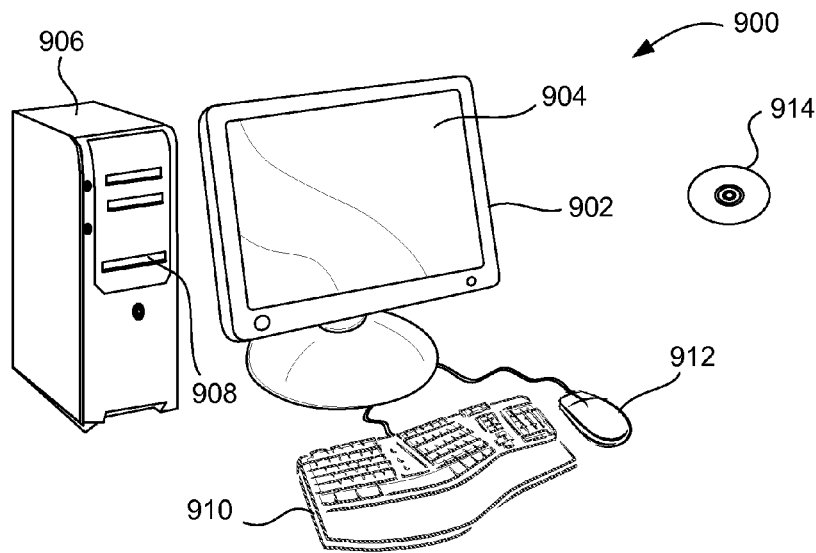
FIGS. 5A and 5B illustrate a computer system suitable for implementing embodiments of the present invention.
Figure 5B:
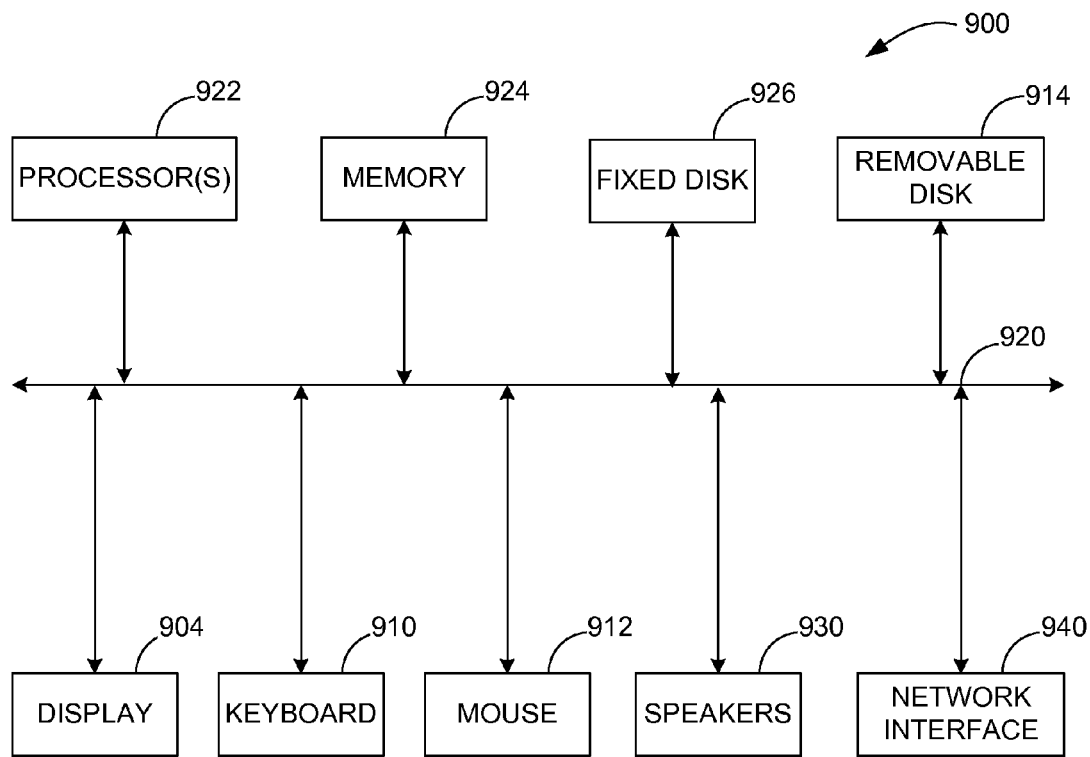

FIGS. 5A and 5B illustrate a computer system 900 suitable for implementing embodiments of the present invention. FIG. 5A shows one possible physical form of the computer system. Of course, the computer system may have many physical forms including an integrated circuit, a printed circuit board, a small handheld device (such as a mobile telephone or PDA), a personal computer or a super computer. Computer system 900 includes a monitor 902, a display 904, a housing 906, a disk drive 908, a keyboard 910 and a mouse 912. Disk 914 is a computer-readable medium used to transfer data to and from computer system 900.

FIG. 5B is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary storage medium (such as a hard disk) that is slower than primary storage. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

We claim:

1. A method of creating a local signature database on a mobile computing device, said method comprising:
   identifying digital files present upon a mobile computing device, said mobile computing device subject to a DLP (data leakage prevention) policy of an enterprise;
   for each of said digital files, calculating a unique digital signature on said mobile device;
   sending said calculated digital signatures of said digital files over a communication link from said mobile device to a computer of said enterprise having a global signature database;
   receiving, from said enterprise computer, an identification of a subset of said sent calculated digital signatures, said subset deemed by said enterprise to represent sensitive files; and
   creating a local signature database on said mobile device using said subset of said sent calculated digital signatures, whereby said local signature database represents a subset of said digital files present upon said mobile device that may not be transferred from said mobile device.

2. A method as recited in claim 1 wherein said sensitive files are files decided by said enterprise that may not be made available outside of said enterprise.

3. A method as recited in claim 1 wherein said identification of a subset is a subset of said sent calculated digital signatures.

4. A method as recited in claim 1 wherein said identification of a subset is a plurality of serial numbers, each serial number uniquely identifying one of said sent calculated digital signatures of said subset.

5. A method as recited in claim 1 wherein said DLP policy indicates conditions in which said sensitive files may not be transferred from said mobile device.

6. A method as recited in claim 1 further comprising:
   transferring said DLP policy from said enterprise computer to a database of said mobile device.

7. A method of screening a file on a mobile computing device, said mobile computing device subject to a DLP (data leakage prevention) policy of an enterprise, said method comprising:
   determining that a triggering event has occurred on said mobile computing device, said triggering event including an identification of a digital file on said mobile device;

determining that said triggering event is an event covered by said DLP policy, said DLP policy being stored in a database on said mobile device;

determining a unique characteristic of said digital file;

searching a local signature database of said mobile device to determine whether said unique characteristic of said digital file is present within said local signature database, wherein said local signature database is a subset of calculated digital signatures sent by a computer of said enterprise having a global signature database; and when it is determined that said unique characteristic is present within said local signature database, blocking said triggering event from occurring on said mobile device.

8. A method as recited in claim 7 wherein said characteristic of said digital file is a unique digital signature of said digital file.

9. A method as recited in claim 7 wherein said characteristic of said digital file is a file name of said digital file, a timestamp of said digital file, or a file name and a timestamp of said digital file.

10. A method as recited in claim 7 wherein said triggering event is a potential action by an operating system of said mobile device attempting to transfer said digital file from said mobile device.

11. A method as recited in claim 7 further comprising:

sending a violation notice to a computer of said enterprise that includes said triggering event and a destination associated with said triggering event.

12. A method as recited in claim 7 further comprising:

downloading said DLP policy from a computer of said enterprise to said mobile device.

13. A method as recited in claim 7 wherein said local signature database includes digital signatures of a subset of all computer files present on said mobile device.

14. A method of filtering digital signatures from a mobile computing device, said method comprising:

generating a database of digital signatures, each digital signature uniquely representing a computer file within an enterprise, wherein each of said computer files is deemed a sensitive file of said enterprise;

establishing a network connection between said enterprise and a mobile computing device, wherein said mobile computing device is subject to a DLP (data leakage prevention) policy of said enterprise;

receiving a plurality of digital signatures from said mobile device, said received digital signatures representing computer files present on said mobile device;

comparing said received digital signatures with said database of digital signatures; and returning to said mobile computing device an identification of those received digital signatures that match with any of said database of digital signatures, wherein said mobile computing device is apprised of sensitive files of said enterprise.

15. A method as recited in claim 14 wherein said sensitive files are files decided by said enterprise that may not be made available outside of said enterprise.

16. A method as recited in claim 14 wherein said identification is those received digital signatures that match with any of said database of digital signatures.

17. A method as recited in claim 14 wherein said identification is a plurality of serial numbers, each serial number uniquely identifying one of said received digital signatures.

18. A method as recited in claim 14 wherein said DLP policy indicates conditions in which said sensitive files may not be transferred from said mobile device.

19. A method as recited in claim 14 further comprising:

downloading said DLP policy from a computer of said enterprise to said mobile device.

20. A method as recited in claim 14 wherein said network connection is a wireless connection.

\* \* \* \* \*